United States Patent [19]

Winkelbauer et al.

[11] Patent Number: 5,028,570
[45] Date of Patent: Jul. 2, 1991

[54] SILICON NITRIDE BONDED MAGNESIA REFRACTORY AND METHOD

[75] Inventors: Howard M. Winkelbauer, McKeesport; Ke-Chin Wang, Pittsburgh, both of Pa.

[73] Assignee: Dresser Industries, Inc., Dallas, Tex.

[21] Appl. No.: 538,836

[22] Filed: Jun. 15, 1990

[51] Int. Cl.$^5$ ............................................. C04B 35/04
[52] U.S. Cl. ..................................... 501/97; 501/109; 501/122
[58] Field of Search ................. 501/97, 108, 109, 122

[56] References Cited

U.S. PATENT DOCUMENTS

| | | | |
|---|---|---|---|
| 3,765,914 | 10/1973 | LaBar et al. | 501/122 X |
| 3,839,540 | 10/1974 | Ariol | 501/97 X |
| 4,533,646 | 8/1985 | Wang et al. | 501/97 |
| 4,578,363 | 3/1986 | Campos-Loriz | 501/97 X |
| 4,581,295 | 4/1986 | DeLiso et al. | 501/97 X |

*Primary Examiner*—Karl Group

[57] ABSTRACT

A mix for forming a silicon nitride bonded magnesia refractory shape consisting essentially of; for each 100 wt. % thereof at least, about 3 to 20 wt. % of a high purity silicon powder containing no more than about 0.2 wt. % metallic impurities and, correspondingly, 97 to 80 wt. % of a high purity magnesite; and the resultant refractory shape formed after shaping of the mix and nitriding thereof and the method of making such shape.

8 Claims, No Drawings

SILICON NITRIDE BONDED MAGNESIA REFRACTORY AND METHOD

BACKGROUND OF THE INVENTION

The present invention relates to silicon nitride bonded magnesia brick particularly suited for use in the processing of molten aluminum and its alloys, particularly aluminum-lithium alloys which are used in aerospace applications. These alloys typically contain about 2-3 wt.% lithium which significantly increases the strength of aluminum and decreases weight.

A number of refractory compositions have been proposed for the processing of such molten aluminum materials. However, they are not entirely satisfactory, particularly in the processing of molten aluminum-lithium alloys which have a very corrosive and fluid character. These alloys have a very sharp melting point and above that point have a viscosity like that of water. Also, superheating of the alloys is necessary to prevent freezing of the metal before shape forming can be accomplished. At such superheating temperatures lithium tends to vaporize out of the alloy and because of its low surface tension tends to penetrate into most refractory linings. Because of lithium's corrosive nature most conventional refractories are readily destroyed. An additional deficiency with most refractories is that after reaction with such alloys the eroded refractory contaminates such alloys resulting in a severe loss in the strength of the metal. Common contaminants such as iron, silicon, calcium, sodium, and the like must not, in total, exceed 0.05 wt.% in these alloys in order not to adversely affect the strength.

For these reasons, only two refractories have been found which can provide a reasonable containment of these alloys. These are an oxide bonded magnesia and a silicon nitride bonded silicon carbide. However, even these are not entirely satisfactory. Both contaminate the alloy to an unacceptable degree. The oxide bonded magnesia refractories are also deeply penetrated by the molten alloys and the silicon nitride bonded refractories, while not deeply penetrated, are adversely weakened by attack on the silicon carbide grains.

In addition to these deficiencies processing of mixes to make the shapes; such as brick, by molding were not entirely satisfactory in that the brick showed weakness at the press in the formation of "pressure" cracks. Efforts to make a shape free of cracking even after many mix changes have not been satisfactory.

SUMMARY OF THE INVENTION

The present invention overcomes the problems of the prior refractories by providing silicon nitride bonded magnesia refractory shapes which are more corrosion resistant to molten aluminum-lithium alloys than prior art compositions and which, because of this increased corrosion resistance, do not significantly contaminate the sensitive aluminum-lithium alloys and which resist pressure cracks during pressing.

Briefly, the present invention comprises a mix for forming a silicon nitride bonded magnesia refractory shape consisting essentially of, for each 100 wt.% thereof, at least about 3 to 20 wt.% of high purity silicon powder containing no more than about 0.2 wt.% metallic impurities and, correspondingly, 97 to 80 wt.% of a high purity magnesite.

The invention also comprises the resultant refractory shapes and the method of making such refractory shapes as herein after set forth.

DETAILED DESCRIPTION

The two essential components of the instant mix are the high purity silicon utilized and the high purity magnesia. As to the silicon, it must contain no more than about 0.2 wt.% of total metallic impurities; preferably less than about 0.15 wt.% and must be sized −65 mesh; preferably −325 mesh. Most suitably, the silicon powder should contain the least amounts of calcium possible, preferably no more than about 0.01% calcium.

As to the magnesia, it is preferably deadburned magnesite containing at least about 97.5% MgO; preferable 99% MgO. Any type of high purity magnesite is suitable for this purpose, such as Dead Sea Periclase, or any other deadburned magnesite containing at least about 97.5% MgO.

To prevent pressure cracks during pressing, it has been found that a certain screen analysis should be used. This preferred screen analysis consists of about 26% −6+10 mesh, about 24% −10+28 mesh, about 15% −28+65 mesh, about 6% −65+150 mesh, about 6% −150+325 mesh and about 23% −325 mesh: all of mesh sizes being Tyler. In fact, all mesh sizes herein are Tyler.

As to proportions, there should be about 3 to 20 wt.% of the high purity silicon powder and, correspondingly, about 97 to 80 wt.% of the high purity magnesia, A.

While not essential, it is preferred to add to the mix a temporary binder. As used herein, the term "temporary binder" refers to any material which will act to hold the mix together during pressing and to improve the green strength thereof. Such binders are degraded and consumed at the temperatures used for the firing of the shapes. Thus, they are temporary in the sense they are present only to improve the green strength of the shaped mix and to maintain it until such time as the silicon nitride matrix is formed into a bonding silicon nitride phase.

As temporary binders, there can be used any high purity binder that provides adequate green strength to the shape and does not leave a residue which can contaminate the shape. Particularly preferred is Dow ceramic binder XUS 40303.00 which produces high green strength and burns-out during firing without leaving a residue. Also, suitable are corn starch and liqnosulfonates. Such binders are used in their usual proportions; namely, anywhere from about 1 to 6 wt.% for each 100 wt.% of the mix of magnesia and silicon.

To make the shape, the mix components are uniformly admixed in mixers conventionally used for this purpose, the mix formed into the shape desired by any conventional manner; in the case of brick any conventional brick press and press pressures can be used, and the shape nitrided and fired under conventional conditions; i.e., under a nitrogen atmosphere at a temperature of about 2100 to 2600° F. for a time sufficient to convert the silicon powder into the bonding silicon nitride phase. The time required will vary dependent upon the amount of silicon in the mix, the size of the silicon addition and the thickness of the shape and the optimum time can be determined by routine experimentation. A standard nitriding schedule used with shapes which contain about 13% silicon powder and are less than 4 inches in thickness is shown in Examples 14 and 15.

The invention will be further described in connection with the following examples which are set forth for purposes of illustration only. In these examples all the shapes were rectangular 9×4.5×2" brick formed by pressing in a Lassman press. Also, the analyses of the magnesites and silicon powders used in these examples are set forth in Table VI.

EXAMPLES 1 to 3

Three different brick samples were made with varying amounts of silicon and tested for adequate fired strength The mix compositions, press conditions, and test results are set forth in Table I below. The magnesite and silicon analyses are set forth in Table VI.

The results show that at least about 3% silicon was a minimal amount required for adequate strength and that while brick containing 20% silicon were much stronger, brick with such high level of silicon tended to be more difficult to press. Microprobe analysis of the nitrided brick showed that during nitriding, lime had concentrated in the bonding matrix. Lime is known to flux silicon nitride and decrease its hot strength. Silica and boron are also other contaminants in deadburned magesite grain of the highest purity.

TABLE I

|  | Example No. | | |
| --- | --- | --- | --- |
|  | 1 | 2 | 3 |
| Deadburned Magnesite, C −4 mesh through fines | 97% | 87% | 80% |
| Micronized Silicon A Plus Additions: | 3 | 13 | 20 |
| 50/50 Solution of Lignosulfonate and Water | 2 | 2 | 2 |
| Tempering Water | 1 | 1 | 1 |
| Forming Pressure, psi | 18,000 all brick showed hairline pressure cracks on the 9 × 2" faces | | |
| Bulk Density After Drying, pcf | 176 | 166 | 157 |
| Firing: | standard nitriding burn | | |
| Weight Gain During Nitriding | 1.2 | 7.6 | 11.6 |
| Bulk Density, pcf | 174 | 172 | 168 |
| App. Porosity, % | 18.7 | 18.9 | 20.5 |
| App. Specific Gravity | 3.43 | 3.41 | 3.38 |
| Cold Crushing Strength, psi | * | 8230 | 13,420 |
| Modulus of Rupture, psi on 6 × 1 × 1" bars |  |  |  |
| at room temperature | * | 820 | 1490 |
| at 2700° F. | * | 180 | 260 |
| Hot Crushing Strength at 2800° F., psi on 1 × 0.7 × 0.7" bars | * | * | 480 |
| X-Ray Diffraction Analysis Phases Detected other than Periclase (MgO) | No $\beta Si_3N_4$ | $\alpha Si_3N_4$ Forsterite $\beta Si_3N_4$ | $\beta Si_3N_4$ |

Microprobe analysis of Mix B revealed that lime was concentrated in the matrix phases. No calcium could be detected in the deadburned magnesite grains, although it was detected in the grains before the brick was nitrided.
*These samples broke during sample preparation.

EXAMPLES 4 and 5

Brick were made as in Examples 1 to 3, but using a higher purity magnesite. The results are set forth in Table II below. They show brick of a higher density than those of Examples 1 to 3 which is desirable since it aids the refractory in resisting a fluid melt.

However, the use of a purer magnesite alone did not give improved strength. The corn starch binder also appeared to improve density as opposed to the lignosulformate binder. Use of a corn starch binder is desirable since it has a lower lime content than the lignosulfonate.

TABLE II

|  | Example No. | |
| --- | --- | --- |
|  | 4 | 5 |
| Dead Sea Periclase, D −4 mesh through fines | 87% | 87% |
| Micronized Silicon A Plus Additions: | 13% | 13 |
| 50/50 Solution of Lignosulfonate and Water | 2 | — |
| 50/50 Solution of corn starch | — | 4 |
| Tempering Water | 1 | — |
| Forming Pressure, psi | 18,000 | 18,000 |
| Bulk Density at the Press, pcf | 169 | 172 |
|  | all brick had hair line pressure cracks on the 9 × 2" face | |
| Firing: | standard nitriding burn | |
| % Weight Gain During Nitriding | 5.9 | 4.1 |
| Bulk Density, pcf | 174 | 176 |
| App. Porosity, % | 18.9 | 17.3 |
| App. Specific Gravity | 3.44 | 3.41 |
| Modulus of Rupture, psi on 6 × 1 × 1" bars at 2700° F. | 330 | 520 |
| Nitrogen Level, % | 6.2 | — |

EXAMPLES 6 to 11

Brick were made as set forth in Example 1 to 3, but with plus additions of lime or carbon black to determine if improved hot strength could be obtained. The mix formulations and test results are set forth in Table III.

Addition to carbon black made a modest improvement in hot strength. Additional studies were made utilizing addition of alumina, aluminum, unstabilized zirconia, and preformed sialon powders, but no strength improvement resulted.

Also, modulus of rupture testing of the brick of these examples was done under oxidizing conditions. Bars tested at 2700° F. showed a severe loss of nitrogen (about 94%) during testing, but testing under oxidizing conditions at lower temperatures (<2000° F.) in molten aluminum-lithium alloys (near 1220° F.) showed the silicon nitride bonded magnesia had acceptable strength and superior corrosion resistance for such application.

TABLE III

|  | Example No. | | | | | |
| --- | --- | --- | --- | --- | --- | --- |
|  | 6 | 7 | 8 | 9 | 10 | 11 |
| Deadburned Magnesite A, −4 mesh through fines | 87% | — | — | — | — | — |
| Deadburned Magnesite C, −4 mesh through gines | — | 87% | 87% | — | 87% | 87% |
| Deadburned Magnesite C, −4 mesh to +28 mesh | — | — | — | 87% | — | — |
| Micronized Silicon A | 13 | 13 | 13 | 13 | 13 | 13 |

TABLE III-continued

|  | Example No. | | | | | |
| --- | --- | --- | --- | --- | --- | --- |
|  | 6 | 7 | 8 | 9 | 10 | 11 |
| Plus Additions: | | | | | | |
| Lime | — | 1 | 3 | — | — | — |
| Carbon Black | — | — | — | — | 0.5 | 1.0 |
| 50/50 Solution of Corn Starch and Water | 4 | 4 | 4 | 4 | 4 | 4 |
| Tempering Water | 0.5 | 1.0 | 1.5 | 0.5 | 0.5 | 0.5 |
| Forming pressure, psi | 18,000 | | | | | |
|  | all brick had hair line cracks on the 9 × 2" faces | | | | | |
| Bulk Density at the Press, pcf | 174 | 172 | 171 | 169 | 171 | 171 |
| Firing: | standard nitriding burn | | | | | |
| % Weight Gain | 4.5 | 3.9 | 3.9 | 5.1 | 4.3 | 4.0 |
| Bulk Density After Firing, pcf | 176 | 170 | 168 | 169 | 171 | 170 |
| Modulus of Rupture, psi, at 2700° F., on 6 × 1 × 1" bars | 140 | 120 | 140 | 130 | 280 | 390 |

EXAMPLES 12 and 13

The mix of Example 5 was compared with a mix in which a purer silicon, silicon B, was used, but a less pure magnesite. The refractory formulations and test results are set forth in Table IV.

It will be seen that the use of the purer silicon resulted in vastly increased strength even when a lower purity magnesite was utilized. The most significant impurity is calcium since once oxidized, the calcium in the form of lime is very detrimental.

TABLE IV

|  | Example No. | |
| --- | --- | --- |
|  | 12 | 13 |
| Dead Sea Periclase, D —4 mesh through fines | 87% | — |
| Deadburned Magnesite B, —4 mesh through fines | — | 87% |
| Micronized Silicon A | 13 | — |
| Micronized Silicon B | — | 13 |
| Plus Additions: | | |
| 50/50 Solution of corn starch and water | 4 | 4 |
| Tempering Water | — | 0.5 |
| Forming Pressure, psi | 18,000 | 15,000 |
| Bulk Density at the Press, pcf | 172 | 169 |
|  |  | hairline cracks |
| Dried Density, pcf | 166 | — |
| Firing: | standard nitriding burn | |
| % Weight Gain During Nitriding | 5.8 | 6.1 |
| Measured Bulk Density, pcf | 176 | 176 |
| Modulus of Elasticity × $10^6$ psi, on whole brick | 2.5 | 2.6 |
| Cold Crushing Strength, psi on 1" cubes | 4,266 | 9,384 |
| Modulus of Rupture, psi on 6 × 1 × 1" bars | | |
| at room temperature | 756 | 950 |
| at 2000° F. | 1674 | 1632 |
| Thermal Shock Tests | | |
| Propane Oxygen Flame Impingement Test | | |
| Rating | Pass | Pass |
| Degree of Cracking | None | None |
| Degree of Spalling | None | None |
| Loss of Strength Test | | |
| 5 cycles at 2200° F. | | |

TABLE IV-continued

|  | Example No. | |
| --- | --- | --- |
|  | 12 | 13 |
| 6 × 1 × 1" bars | | |
| MOR before test | 788 | 870 |
| MOR after test | 657 | 463 |
| % change | −17 | −47 |
| X-Ray Diffraction Analysis Phases detected other than Periclose | — | $\alpha Si_3N_4$ $\beta Si_3N_4$ Magnesium-silicon nitride (no silicon, $Si_2ON_2$, or forsterite were detected) |
| Nitrogen Content, % | — | 7.4 |

EXAMPLES 14 and 15

These examples show the effect of mix grind in overcoming the tendency to form pressure cracks during shape forming (usually pressing). The mix formulations, grinds, and test results are set forth in Table V. The formulation of Example 15 was used to make brick A and B which were identical as to formulation and screen analysis, but which were formed at different pressures.

The nitriding schedule used in forming this brick were as follows:
(1) Increase the temperature to 700° F. at 200° F./hour and hold for 5 hours at 700° F.,
(2) Increase from 700° to 2200° F. at 200° F./hour and for 4 hours at 2200° F.,
(3) Increase from 2200° to 2300° F. at 50° F./hour and hold for 8 hours at 2300° F.,
(4) Increase from 2300° to 2400° F. at 50° F./hour and soak for 12 hours at 2400° F.,
(5) Increase from 2400° to 2500° F. at 50° F./hour and soak for 16 hours at 2500° F.,
(6) Increase from 2500° to 2600° F. at 50° F./hour and soak for 6 hours at 2600° F., and
(7) The brick was then permitted to cool down. A positive nitrogen pressure was maintained from the end of the 700° F. hold throughout the run to 1800° F. during the cooldown.

TABLE V

|  | Example No. | |
| --- | --- | --- |
|  | 14 | 15 |
| Dead Sea Periclase, −4 mesh through fines | 87% | 87 |
| Silicon B | 13 | 13 |

TABLE V-continued

|  | | A | B |
|---|---|---|---|
| Plus Additions 6.25% Solution of Dow's ECB in Water | 2.8 | 4.0 | |
| Forming Pressure, psi | 18,000 all brick were weak and cracked | 15,000 all brick stronger, no hairline pressure cracks seen | 18,000 all brick stronger, no hairline pressure cracks seen |
| Bulk Density at the Press, psi | 166 | 171 | 171 |
| Firing: | | standard nitriding run | |
| % Weight Gain | | 7.6 | 7.6 |
| Measured Bulk Density, pcf | | 178 | 178 |
| Bulk Density, pcf | — | — | 177 |
| App. Porosity, % | — | — | 18.9 |
| App. Specific Gravity | — | — | 3.40 |
| Cold Crushing Strength, psi | — | — | 7970 |
| Modulus of Rupture, psi | | | |
| at 1500° F. | | | 1390 |
| at 2000° F. | | | 1930 |
| Screen Analysis | | | |
| 6/10 mesh | 20% | | 26% |
| 10/28 mesh | 31 | | 24 |
| 28/65 mesh | 5 | | 15 |
| 65/150 mesh | 2 | | 6 |
| 150/325 mesh | 9 | | 6 |
| −325 mesh | 33 | | 23 |

Table VI below shows the analysis of the various magnesites and silicon powders used in all the Examples.

TABLE VI

Analysis of the Raw Materials

|  | A | B | C | D |
|---|---|---|---|---|
| Deadburned Magnesite | | | | |
| Chemical Analysis | | | | |
| Silica ($SiO_2$) | 0.76% | 0.40% | 0.7% | 0.05% |
| Alumina ($Al_2O_3$) | 0.10 | 0.14 | 0.2 | 0.10 |
| Titania ($TiO_2$) | — | <0.01 | — | <0.01 |
| Iron Oxide ($Fe_2O_3$) | 0.17 | 0.14 | 0.2 | 0.10 |
| Chromic oxide ($Cr_2O_3$) | — | 0.17 | — | 0.08 |
| Lime (CaO) | 2.32 | 1.63 | 0.6 | 0.54 |
| Boron oxide ($B_2O_3$) | 0.02 | 0.04 | 0.15 | <0.005 |
| Total Analyzed | 3.3 | 2.5 | 1.7 | 0.9 |
| By Difference | | | | |
| Magnesia (MgO) | 96.7 | 97.5 | 98.3 | 99.1 |
| Total | 100.0 | 100.0 | 100.0 | 100.0 |
| Bulk Specific Gravity, g/cc | 3.47 | 3.33 | 3.39 | 3.41 |
| Silicon Powders | | | | |
| Chemical Analysis (max.) | | | | |
| Calcium (Ca) | 0.04% | 0.01% | | |
| Aluminum (Al) | — | 0.07 | | |
| Iron (Fe) | 0.35 | 0.10 | | |
| Particle Size | 97 | 99 | | |
| % −325 mesh | | | | |
| % Particles Fines than; | | | | |
| 60 microns | 100 | 100 | | |
| 40 microns | 98 | 99 | | |
| 20 microns | 96 | 98 | | |
| 10 microns | 82 | 92 | | |
| 4 microns | 49 | 34 | | |
| 2 microns | 28 | 13 | | |
| 1 microns | 13 | 4 | | |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A silicon nitride bonded magnesia refractory shape formed by nitriding a mix consisting essentially of; for each 100 wt.% thereof, at least about 3 to 20 wt.% of a high purity silicon powder containing no more than about 0.2 wt. % metallic impurities and, correspondingly, 97 to 80 wt.% of a high purity deadburned magnesite to convert said silicon powder into a bonding silicon nitride phase.

2. The refractory shape of claim 1 wherein said magnesite has a purity of at least about 97.5% MgO.

3. The refractory shape of claim 2 wherein said silicon powder has a mesh size (Tyler) of −65 mesh.

4. The refractory shape of claim 3 wherein the screen analysis of the mix is:

|  | Particle Size (Tyler) |
|---|---|
| About 26% | −6 +10 mesh |
| About 24% | −10 128 mesh |
| About 15% | −28 +65 mesh |
| About 6% | −65 +150 mesh |
| About 6% | −150 +325 mesh |
| About 23% | −325 mesh |

5. The refractory shape of claim 1, 2, 3 or 4 wherein the mix includes a temporary binder in an amount of about 1 to 6 wt.% for each 100 wt.% of said silicon powder and said magnesite.

6. The method of making a silicon nitride bonded magnesia refractory shape suitable for use in processing molten aluminum and its alloys comprising admixing from about 3 to 20 wt.% of a high purity silicon powder containing no more than about 0.2 wt.% metallic impurities with correspondingly 97 to 80 wt.% of a high purity deadburned magnesite, and for each 100 wt.% of said silicon powder and magnesite, about 0 to 6 wt.% of a temporary binder, forming the mixture into the shape desired, and nitriding the formed shape to convert the silicon powder into a bonding silicon nitride phase.

7. The method of claim 6 wherein the screen analysis of the mixture is:

|  | Particle Size (Tyler) |
|---|---|
| About 26% | −6 +10 mesh |
| About 24% | −10 +28 mesh |
| About 15% | −28 +65 mesh |
| About 6% | −65 +150 mesh |
| About 6% | −150 +325 mesh |
| About 23% | −325 mesh |

8. The method of claim 6 or 7 comprising forming the shape at a pressure of about 18,000 psi.

* * * * *

UNITED STATES PATENT AND TRADEMARK OFFICE
CERTIFICATE OF CORRECTION

PATENT NO. : 5,028,570

DATED : July 2, 1991

INVENTOR(S) : Winkelbauer, et al

It is certified that error appears in the above-identified patent and that said Letters Patent is hereby corrected as shown below:

Claim 4 (col. 8, line 51), cancel "-10 128" and substitute therefor -- -10 +28 --.

Signed and Sealed this

Thirteenth Day of October, 1992

Attest:

DOUGLAS B. COMER

*Attesting Officer*      *Acting Commissioner of Patents and Trademarks*